United States Patent [19]
Lin et al.

[11] Patent Number: 5,691,036
[45] Date of Patent: Nov. 25, 1997

[54] HIGH PRESSURE HIGH TEMPERATURE CUSHIONING MATERIAL

[75] Inventors: Michael Yuan-Chang Lin; Yen-Jung Hu; Hsu-Yeh Huang; Der-Guey Luo, all of Hsinchu, Taiwan

[73] Assignees: Du Pont Taiwan Limited; Industrial Technology REsearch Institute, both of Taiwan

[21] Appl. No.: 606,142

[22] Filed: Feb. 23, 1996

Related U.S. Application Data

[60] Provisional application No. 60/010,807 Jan. 30, 1996.
[51] Int. Cl.$^6$ .................................................. B32B 5/02
[52] U.S. Cl. .................... 428/172; 442/36; 442/57; 442/35
[58] Field of Search ................... 442/35, 36, 57; 428/172

[56] References Cited

U.S. PATENT DOCUMENTS

| | | | |
|---|---|---|---|
| 3,657,068 | 4/1972 | Ivanowicz. | |
| 3,775,231 | 11/1973 | Thomas | 161/57 |
| 4,284,680 | 8/1981 | Awano et al.. | |
| 4,473,609 | 9/1984 | Caldwell | 428/141 |
| 4,647,497 | 3/1987 | Weeks | 428/284 |
| 4,832,852 | 5/1989 | Wells et al. | 210/671 |

*Primary Examiner*—Kathleen Choi

[57] ABSTRACT

A cushioning material is disclosed having at least two layers of unwoven, temperature-resistant staple fibers and layers of reinforcing scrim between the unwoven layers, wherein the entire structure is needlepunched for integrity and one face is embossed with a pattern to increase resiliency.

13 Claims, 3 Drawing Sheets

HIGH PRESSURE HIGH TEMPERATURE CUSHIONING MATERIAL

This application claims the benefit of U.S. Provisional application Ser. No. 60/010,807, filed Jan. 30 1996 now abandoned.

BACKGROUND OF THE INVENTION

1. Field of the Invention

In manufacture of sheet materials by hot pressing processes, there is a need for durable cushioning material located between the sheet material and platens of the hot pressing machinery. The present invention relates to such cushioning material in an improved form. When laminated boards, plywoods, or circuit boards or the like, are produced by hot pressing processes, a cushioning material is often interposed between a platen in the hot pressing machine and the item being pressed to rectify any unevenness of the heating plate as well as to exert uniform pressure onto respective surfaces of the item.

2 Description of the Prior Art

U.S. Pat. No. 4,284,680, issued Aug. 18, 1981 on the application of Awano et al., discloses a cushioning material wherein fibrous batts of felt-like material are interspersed with layers of so-called foundation fabric and heat set under tension to yield a cushioning material said to exhibit high density, high elasticity and excellent cushioning properties.

SUMMARY OF THE INVENTION

This invention relates to a cushioning material comprising at least two fibrous batts of staple fibers with adjacent facing surfaces and at least one outer surface, and one layer of scrim between the facing surfaces. The fibrous batts are made using aramid staple fibers and are from 1.5 to 10 millimeters thick. At least one of the fibrous batts has embossing on an outer surface; and the embossing has depressions with a depth of 10 to 40 percent of the thickness of the batt and an average width of 0.5 to 4 millimeters covering 25 to 70 percent of the total outer surface. The scrim is also made using aramid fibers and has a basis weight from 30 to 120 grams per square meter.

DETAILED DESCRIPTION

Figure 1:
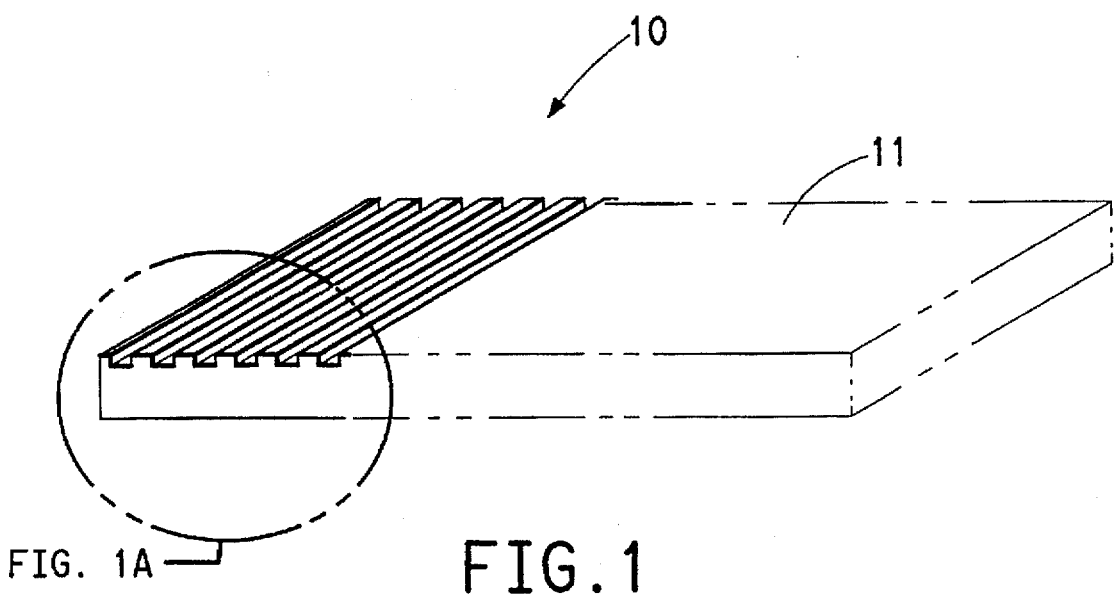
FIG. 1 represents one embossing configuration which can be used in heat setting the cushioning material of this invention.
Figure 1A:
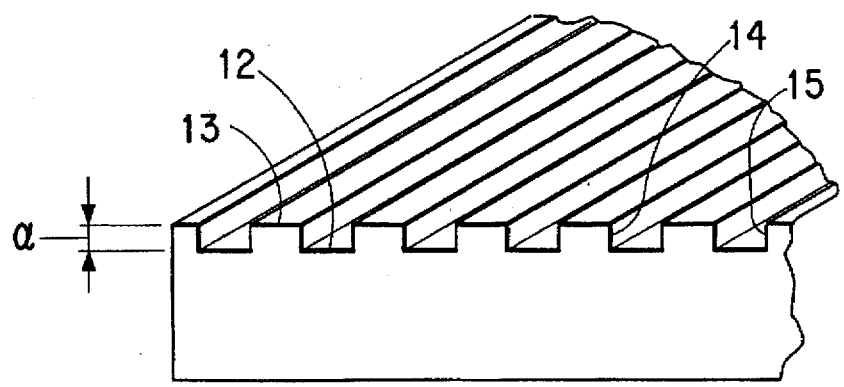

The cushioning material of the present invention represents an improvement over cushioning material of the prior art in that the cushioning material of the present invention exhibits higher elasticity and maintains its high elasticity, in use, for a significantly longer time.

In one aspect of the present invention, a cushioning material is provided which is multi-layered and needle-punched and which has, on one side, an embossed pattern. The embossed pattern appears to act, in a way not completely understood, to improve resiliency and thickness retention of the cushioning material. While unembossed cushioning material, under conditions of use, may quickly become set in a completely compressed condition with little resilience and little cushioning effect, the embossed cushioning material of this invention maintains resilience and cushioning effect for a much longer time.

Fibrous batts used for the cushioning material of this invention are nonwoven felts made by felting techniques well known in this art. Such batts are made from staple fibers, which are, generally, opened, carded, cross-lapped, and laid to form nonwoven sheeting which is then needled to yield a felt or a batt having some fibers intertangled, by the needling, through the thickness of the batt. In needling operations, barbed needles are punched into the sheeting in such a way that random fibers are drawn through the batt and thereby entangled to afford structural integrity to the batt. While needling is very useful to make batts which can survive the rigors of handling, needling of this single-layer batt is not necessary to practice of the present invention because all of the layers of materials which constitute this invention will be needled together once they are assembled. For purposes of this invention, needling the single-layer batt will hereafter be called "pre-needling" and the term needling will be reserved for the needling conducted on the entire assembly of materials which constitutes the invention.

Fibrous batts for use in this invention can be made from high temperature resistant polymers such as aramids including poly(m-phenylene isophthalamide), poly(p-phenylene terephthalamide), and the like. In uses requiring only moderate temperature resistance, batts in the cushioning material of this invention can be made from fibers of other materials, such as polyamides, polyesters, polyacrylonitriles, and the like. The polymers are used in the form of staple fibers having a length of 3 to 14 centimeters and a linear density of 1 to 10 dtex. Staple fibers shorter than about 3 centimeters are too short for adequate entanglement and yield a batt of inadequate strength; and staple fibers longer than about 14 centimeters are difficult to handle because they become tangled prior to the felting process. Staple fibers with a length of 5 to 8 centimeters are preferred. The linear density of the fibers is not critical but should be adequate to provide strength and bulk, as required.

The fibers for use in batts of this invention should be heat resistant to the extent that they can be heat-set at temperatures above their glass transition temperature and will perform effectively for the intended use. The fibers should exhibit a stiffness which will translate to elasticity and resilience in the final cushioning material. Modulus of the fibers can be taken as a measure of stiffness and, for the fibers of this invention, a modulus of 60 to 1000 g/dtex is preferred.

The fibrous batts of this invention may include up to as much as 10 or 20 weight percent of additive materials, such as metal fibers to increase the heat transfer rate or metal or carbon fibers to decrease static buildup, and the like. The batts are preferably at least 90 weight percent staple fibers. Care must be exercised only that the kind and concentration of additive must not be such that the performance of the felting is detrimentally affected.

The cushioning material of this invention is assembled from at least two of the afore-described fibrous batts with layers of scrim material between the batts. By "scrim material" is meant a sheet material which serves to strengthen and reinforce the cushioning material. Scrim material is made from strong, heat resistant fibers having qualities similar to the fibers used in the fibrous batts. While preferred fibers include poly(m-phenylene isophthalamide) and poly(p-phenylene terephthalamide), scrim fibers can be made from other polymers, such as polyamides, polyesters, polyacrylonitriles, and the like, if usage conditions are not too demanding. The scrim can be woven or nonwoven, although woven is preferred; and, if woven, can be woven from continuous filament or staple yarns; and, if woven from staple yarns, the yarns are preferably made using filaments with a length of 3 to 14 centimeters and a linear density of 1 to 10 dtex.

Woven scrim can be of any weave keeping in mind that the scrim is intended to serve a strengthening and reinforcing function in the cushioning material. A plain weave or a basket weave is preferred with a weave count of 5 to 10 (ends per centimeter-fill and warp) using yarns with a linear density of 300 to 700 dtex. As a general rule, the scrims have an uncompressed thickness of less than about 1 millimeter and a basis weight of 30 to 120 grams per square meter.

Referring now to the drawings, FIG. 1 represents one configuration of an embossing plate for the cushioning material of this invention. Plate 10 is a platen in a heat and pressure embossing device and patterned face 11 is used to emboss and heat set one surface of a fibrous batt in the cushioning material of this invention. Depressions 12 alternate with ridges 13 and, while in this FIG. 1 they run straight and parallel across the face of the platen, depressions 12 and ridges 13 may be placed in any appropriate pattern. It is preferred that depressions 12 should be from 0.5 to 4 millimeters wide, as measured from the center point in the depression depth d on each side wall of a depression. For example, center point 14 represents one-half of depression depth d on one side of depressions 12 and center point 15 represents one-half of depression depth d on the other side of depression 12. The width of depression 12 is the distance between 14 and 15. The depression depth d is preferably 10 to 40 percent of the total thickness of the fibrous batt which it is intended to emboss; and total area of the depressions on patterned face 11 is the product of the total length and the width of depressions 12 thereon. The depressions should cover 25 to 70, and preferably 30 to 60, percent of patterned face 11.

Figure 2:
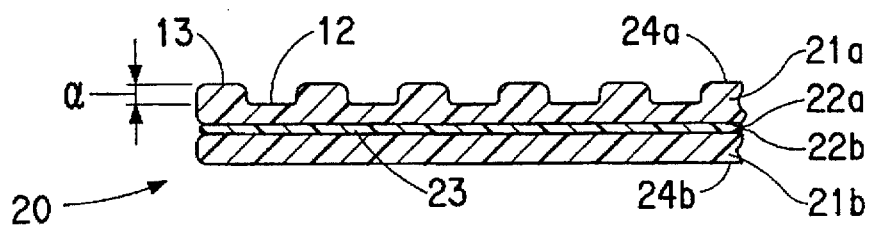
FIGS. 2 and 3 represent partial cross-section views of the cushioning material of this invention.
Figure 3:
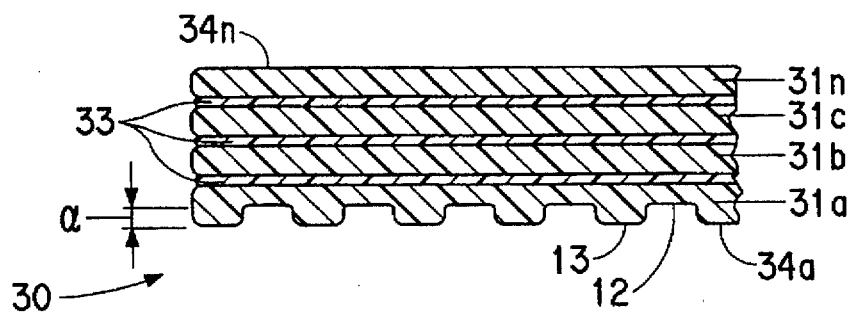

FIGS. 2 and 3 represent partial cross-section views of the cushioning material of this invention. In FIG. 2, cushioning material 20 includes fibrous batts 21a and 21b having adjacent faces 22a and 22b and scrim 23 between those faces. Fibrous batts 21a and 21b have outer surfaces 24a and 24b and outer surface 24a has a pattern of depressions 12 and ridges 13. In FIG. 3, cushioning material 30 includes fibrous batts 31a, 31b, 31c, and 31n with inner adjacent faces and scrim 33 between those faces. Fibrous batts 31a and 31n have outer surfaces 34a and 34n and outer surface 34a has a pattern of depressions 12 and ridges 13. In cushioning materials 20 and 30, depressions 12 have a depth d of 10 to 40 percent of the thickness of fibrous batts 21a and 31a, respectively. The depressions are 0.5 to 4 millimeters wide and cover 25 to 70, and preferably 30 to 60, percent of outside surfaces 24a and 34a, respectively. Area of coverage is calculated for these cushioning materials in the same way as described above for the embossing plate of FIG. 1.

Cushioning material of this invention is made by assembling layers of unembossed fibrous batts, with alternating layers of scrim, needle punching the layers together, and embossing a pattern on one outer surface of one of the fibrous batts. If desired, the unembossed fibrous batts can be pre-needled to impart some structural integrity to the batts for improved handling prior to assembly. The final needling of the assembly can be light or dense depending upon the preferences or needs of a particular application. Needling which is too light may be inadequate to hold the layers together and needling which is too heavy may yield a cushioning material which is too dense with inadequate resilience.

During the embossing process, the entire cushioning material assembly is subjected to heat and pressure and the cushioning material is thereby somewhat stabilized and densified. The entire body of the cushioning material is densified and heat-set and the pattern which results from the embossing presents a raised surface which exhibits a resilience especially useful on hot press machinery. The embossing conditions should be such as will cause the pattern of the embossing plate to be permanently transferred to the cushioning material. While embossing conditions may differ somewhat from material to material, it has been found that a temperature of 200° to 400° C., and preferably 280° to 340° C., under 25 to 75, and preferably 30 to 50 kilograms per square centimeter, for 5 to 12, and preferably 7 to 10 minutes are appropriate embossing conditions for aramids.

Figure 4:
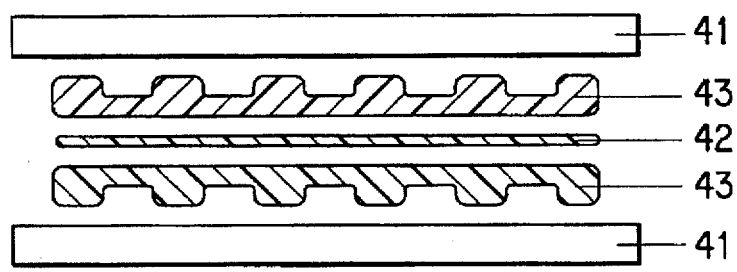
FIG. 4 represents a side-view of the cushioning material of this invention in use.

In use, the cushioning material of this invention is placed between the platens of a heat and pressure device and a workpiece which is to be treated. Referring to FIG. 4, platens 41 are a part of a heat and pressure device (not shown) and workpiece 42 is situated therebetween. Cushioning materials 43 are placed between the platens and the workpiece with the embossed pattern directed toward the platen and away from the workpiece. When platens 41 are forced together, those forces are transferred to workpiece 42 evenly by the smooth surface of cushioning materials 43. If desired or required for any specific purpose, other layers of resilient material can be used in conjunction with the cushioning material of this invention so long as the cushioning material is positioned between a platen and the workpiece and so long as a smooth surface is adjacent to the workpiece.

TEST METHODS

Recovery thickness is determined as follows: To determine the initial thickness of the cushioning material, a sample of the cushioning material to be tested is pressed with a weight of 800 grams per square centimeter at 22 degrees C for 5 to 10 seconds and the thickness is measured and is designated as "a". The material is, then subjected to a pressure of 40 kilograms per square centimeter at 180 degrees C for 40 minutes, and the recovery thickness, designated as "c", is measured on the material 20 minutes after removing the pressure and allowing the material to come to a temperature of about 22 degrees C. Recovery Thickness (RT) is reported as a percent $$RT\% = \frac{c}{a} \times 100$$

EXAMPLES

EXAMPLE 1

A fibrous batting with a basis weight of 615 grams per square meter was prepared from 7.6 centimeter cut length m-aramid staple fiber having a linear density of 2.2 dtex using usual felting machinery. The m-aramid fibers were made from poly(meta-phenylene isophthalamide) sold by E. I. du Pont de Nemours and Company under the tradename Nomex T-450. Reinforcing layers of scrim were used having a density of 80 grams per square meter and woven in a plain weave of 7.5×7.5 per centimeter from the same m-aramid staple fibers as was used in the felt. Four layers of batts and three layers of scrim were alternated to yield a cushion material with a density of 2700 grams per square meter.

Samples of the cushion material were embossed using a plate having straight, parallel, ridges 1 millimeter wide, 1 millimeter apart, and 1 millimeter deep, as shown in FIG. 1. One surface of each cushion was pressed against the plate under a pressure of 40 kilograms per square centimeter at 300 degrees C. for 10 minutes. The embossed depressions were 1 millimeter deep and 1 millimeter wide; and the depressions covered about 50% of the total surface of the cushioning material.

The Recovery Thickness of the cushioning material was determined at 40 kilograms per square centimeter at 180 degrees C. for 40 minutes and the results are set out in Table 1. At the same time, a felt cushion, commercially available as KG355EET, from Ichikawa Woolen Textile Co., Ltd., Japan, was, also, tested as a comparison. The comparison cushion was made from four layers of batting, three layers of scrim, and had a basis weight of 2200 grams per square meter, with flat, unembossed, surfaces. The comparison cushion utilized m-aramid fibers in the batting and in the scrim.

It is clear from the data in Table 1 that the cushioning material of this invention exhibits substantially improved Recovery Thickness as compared with the commercially available cushioning material. A high Recovery Thickness indicates a high resiliency and a continued capability for compression under load.

TABLE 1

| Item | Initial Thickness (mm) | Compressed (mm) | Thickness (%) | Recovery (mm) | Thickness (%) |
| --- | --- | --- | --- | --- | --- |
| Invention | 3.17 | 2.71 | 85.49 | 3.01 | 94.95 |
| Comparison | 3.88 | 2.77 | 71.39 | 3.38 | 87.11 |

EXAMPLE 2

A cushioning material having two layers of batts and one layer of scrim was constructed using the batts and the scrim from Example 1 and having a basis weight of 1300 grams square meter. The cushioning material was embossed under 40 kilograms per square centimeter at 320° C. for 8 minutes and the embossing pattern was the same as in Example 1. The cushioning material of this Example had depressions 1 millimeter deep and 1 millimeter wide; and the depressions covered about 50% of the total surface of the cushioning material.

The cushioning material and an unembossed comparison were subjected to long-term compression tests wherein Recovery Thickness characteristics were determined over many cycles of heat-compression. The unembossed comparison material was the comparison cushioning material from Example 1.

The cycling for heat-compression for this example and for the following example was conducted as follows: For cycles after which no measurements were to be taken, the comparison force was released for five minutes before the compression force was reapplied for the next cycle. For cycles after which a measurement was to be taken, the compression force and the heating source were removed for twenty minutes, the measurements were taken, and the heat and compression force were reapplied for the next cycle.

Results of the test are in TABLE 2. The results indicate that, at all cycle levels, the cushioning material of the invention exhibits higher Recovery Thickness and, therefore, more resilience and cushioning than the material of the comparison.

TABLE 2

| Item (Cycles) | Initial Thickness (mm) | Compressed (mm) | Thickness (%) | Recovery (mm) | Thickness (%) |
| --- | --- | --- | --- | --- | --- |
| INVENTION | | | | | |
| 1 | 2.88 | 2.30 | 79.86 | 2.65 | 92.01 |
| 14 | 2.88 | 2.30 | 79.86 | 2.60 | 90.28 |
| 27 | 2.88 | 2.30 | 79.86 | 2.58 | 89.58 |
| 40 | 2.88 | 2.30 | 79.86 | 2.56 | 88.89 |
| 53 | 2.88 | 2.30 | 79.86 | 2.56 | 88.89 |
| 64 | 2.88 | 2.30 | 79.86 | 2.55 | 88.54 |
| COMPARISON | | | | | |
| 1 | 3.88 | 2.77 | 71.37 | 3.38 | 87.11 |
| 14 | 3.88 | 2.75 | 70.88 | 3.25 | 83.76 |
| 27 | 3.88 | 2.70 | 69.59 | 3.16 | 81.44 |
| 38 | 3.88 | 2.70 | 69.59 | 3.09 | 79.64 |
| 49 | 3.88 | 2.70 | 69.59 | 3.05 | 78.61 |
| 60 | 3.88 | 2.65 | 68.30 | 3.03 | 78.09 |
| 73 | 3.88 | 2.65 | 68.30 | 3.00 | 77.32 |

EXAMPLE 3

A cushioning material was constructed using the same kind and amount of materials and the conditions as set out in EXAMPLE 2, except that the embossing pattern was a screen with a mesh of 3.1×3.1 wires per centimeter wherein the wires had a diameter of 0.7 millimeter. The cushioning material of this Example had depressions 0.7 millimeter deep and 0.7 millimeter wide; and the depressions covered about of the total surface of the cushioning material.

The cushioning material of this invention, an unembossed control of the same material, and the unembossed comparison material from EXAMPLE 1 were subjected to long-term compression recovery tests wherein recovery characteristics were determined after increasing cycles of heat-compression. The unembossed control material was heat set (rather than embossed) under no compression force at 300° C. for ten minutes and was then pretreated under 40 kilograms per square centimeter at 280° C. for 40 minutes to consolidate the material. Results of the test are in TABLE 3.

TABLE 3

| Item (Cycles) | Initial Thickness (mm) | Compressed (mm) | Thickness (%) | Recovery (mm) | Thickness (%) |
| --- | --- | --- | --- | --- | --- |
| INVENTION | | | | | |
| 1 | 3.33 | 2.79 | 83.78 | 3.11 | 93.39 |
| 23 | 3.33 | 2.93 | 87.99 | 3.02 | 90.69 |
| 33 | 3.33 | 2.74 | 82.28 | 3.00 | 90.09 |
| 47 | 3.33 | 2.82 | 84.68 | 2.96 | 88.89 |
| 61 | 3.33 | 2.82 | 84.68 | 2.96 | 88.89 |
| 70 | 3.33 | 2.78 | 83.48 | 2.91 | 87.39 |
| 100 | 3.33 | 2.80 | 84.08 | 2.95 | 88.59 |
| 139 | 3.33 | 2.81 | 84.38 | 2.94 | 88.29 |
| 181 | 3.33 | 2.76 | 82.88 | 2.86 | 85.89 |
| 258 | 3.33 | 2.72 | 81.68 | 2.83 | 84.98 |
| 300 | 3.33 | 2.71 | 81.38 | 2.82 | 84.68 |
| COMPARISON | | | | | |
| 1 | 4.18 | 3.22 | 77.03 | 3.63 | 86.84 |
| 14 | 4.18 | 3.22 | 77.03 | 3.42 | 81.82 |
| 28 | 4.18 | 3.18 | 76.08 | 3.36 | 80.38 |

TABLE 3-continued

| Item (Cycles) | Initial Thickness (mm) | Compressed Thickness (mm) | Thickness (%) | Recovery (mm) | Thickness (%) |
| --- | --- | --- | --- | --- | --- |
| 42 | 4.18 | 3.13 | 74.88 | 3.31 | 79.19 |
| 56 | 4.18 | 3.13 | 74.88 | 3.27 | 78.23 |
| 70 | 4.18 | 3.11 | 74.40 | 3.24 | 77.51 |
| 100 | 4.18 | 3.00 | 71.77 | 3.20 | 76.56 |
| 139 | 4.18 | 2.97 | 71.05 | 3.17 | 75.84 |
| 183 | 4.18 | 2.95 | 70.57 | 3.14 | 75.12 |
| 233 | 4.18 | 2.96 | 70.81 | 3.12 | 76.64 |
| 274 | 4.18 | 2.95 | 70.57 | 3.09 | 73.92 |
| 300 | 4.18 | 2.94 | 70.33 | 3.08 | 73.68 |
| CONTROL | | | | | |
| 1 | 4.56 | 3.60 | 78.95 | 4.13 | 90.57 |
| 41 | 4.56 | 3.50 | 76.75 | 3.92 | 85.96 |
| 53 | 4.56 | 3.46 | 75.88 | 3.90 | 85.53 |
| 72 | 4.56 | 3.35 | 73.46 | 3.77 | 82.68 |
| 113 | 4.56 | 3.33 | 73.03 | 3.66 | 80.26 |
| 146 | 4.56 | 3.40 | 74.56 | 3.63 | 79.61 |
| 184 | 4.56 | 3.36 | 73.68 | 3.57 | 78.29 |
| 270 | 4.56 | 3.39 | 74.34 | 3.54 | 77.63 |
| 300 | 4.56 | 3.22 | 70.61 | 3.50 | 76.75 |

Figure 5:
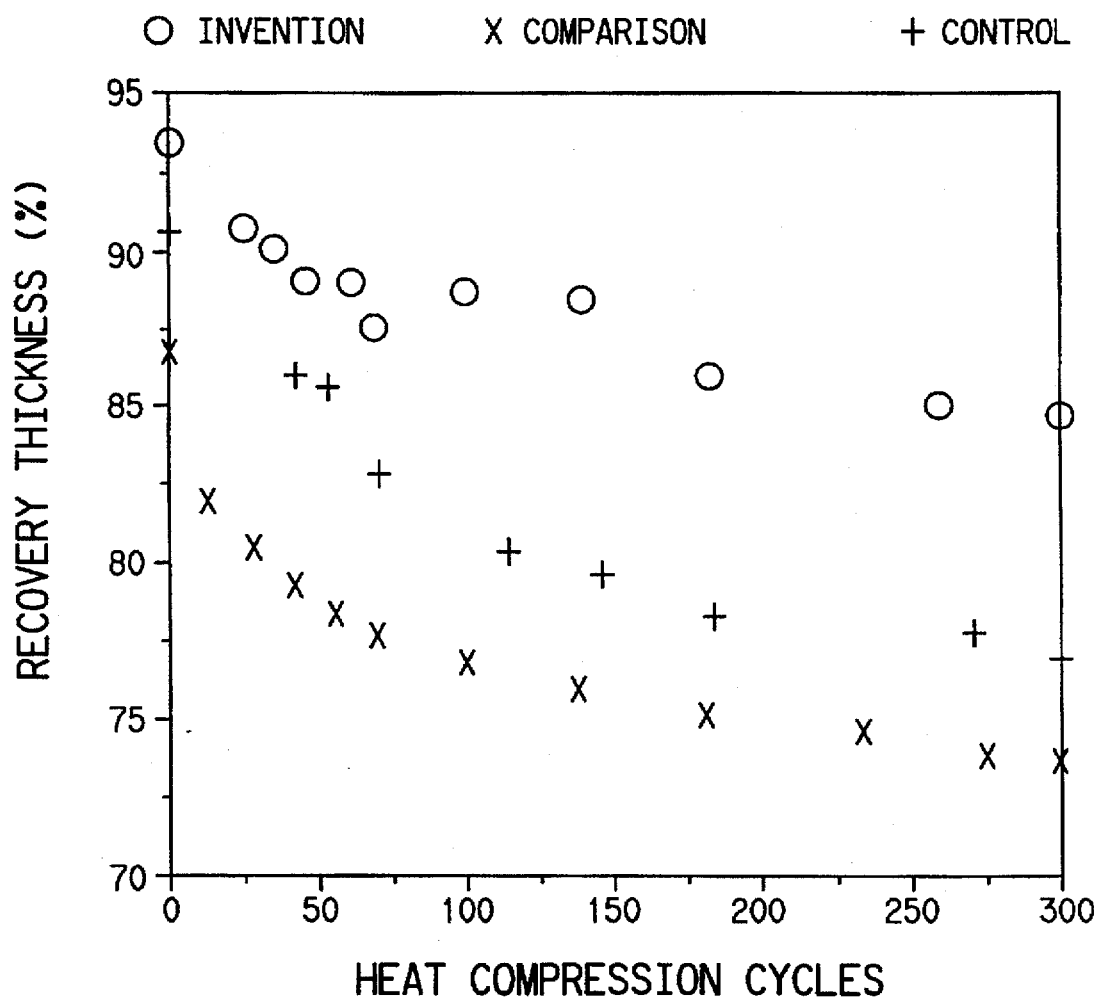
FIG. 5 is a graphical representation of the retained thickness of cushioning material as a function of pressing cycles.

Referring to FIG. 5, the cushioning material of this invention exhibits clearly and significantly higher Recovery Thickness than either of the COMPARISON or the CONTROL materials over the entire range of the cycling test; and the difference in Recovery Thickness between the material of this invention and the other materials was greater as the cycling test continued.

What is claimed is:

1. A cushioning material comprising at least two fibrous batts of staple fibers with adjacent facing surfaces and at least one outer surface and a layer of scrim between the facing surfaces, characterized in that the fibrous batts are staple fibers and are from 1.5 to 10 millimeters thick, at least one of the fibrous batts has embossing on an outer surface, in which depressions having a depth of 10 to 40 percent of the thickness of the batt and an average width of 0.5 to 4 millimeters cover, 25 to 70 percent of the total outside surface; and, the scrim has a density from 30 to 120 grams per square meter.

2. The cushioning material of claim 1 wherein the fibrous batts are nonwoven and comprise at least 90 weight percent staple fibers.

3. The cushioning material of claim 2 wherein the staple fibers of the fibrous batts are 3 to 14 centimeters long.

4. The cushioning material of claim 1 wherein the staple fibers are aramid.

5. The cushioning material of claim 1 wherein the fibers of the scrim are continuous fibers.

6. The cushioning material of claim 1 wherein the fibers of the scrim are staple fibers.

7. The cushioning material of claim 6 wherein the staple fibers of the scrim are 3 to 14 centimeters long.

8. The cushioning material of claim 5 wherein the scrim is woven.

9. The cushioning material of claim 5 wherein the fibers of the scrim are aramid.

10. The cushioning material of claim 6 wherein the fibers of the scrim are aramid.

11. The cushioning material of claim 4 wherein the aramid fibers in the fibrous batts are selected from the group consisting of poly(m-phenylene isophthalamide) fibers and poly(p-phenylene terephthalamide) fibers.

12. The cushioning material of claim 9 wherein the aramid fibers in the scrim are selected from the group consisting of poly(m-phenylene isophthalamide) fibers and poly(p-phenylene terephthalamide) fibers.

13. The cushioning material of claim 10 wherein the aramid fibers in the scrim are selected from the group consisting of poly(m-phenylene isophthalamide) fibers and poly(p-phenylene terephthalamide) fibers.

* * * * *